March 5, 1940.  G. GILLIVER  2,192,304
ELECTRIC MOTOR
Filed Sept. 30, 1937
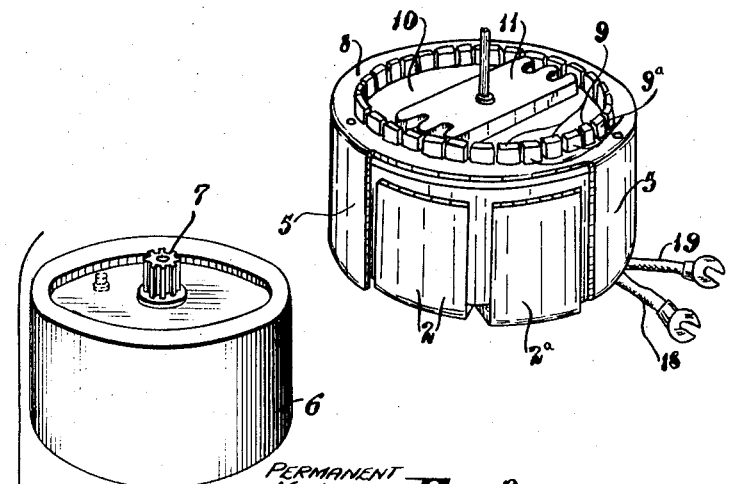
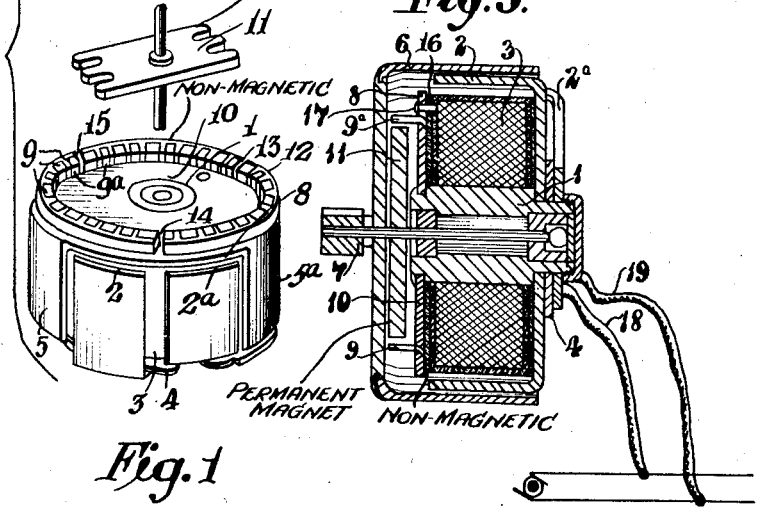
Inventor:
Gilbert Gilliver.
By Brown, Jackson, Boettcher & Dienner
Attys.

Patented Mar. 5, 1940

2,192,304

UNITED STATES PATENT OFFICE 2,192,304

ELECTRIC MOTOR

Gilbert Gilliver, Enfield, England, assignor to Sangamo Electric Company, Springfield, Ill., a corporation of Illinois Application September 30, 1937, Serial No. 166,468
In Great Britain October 13, 1936

5 Claims. (Cl. 172—278)

The present invention relates to synchronous electric motors and is more particularly concerned with self-starting motors suitable for use in electric clocks, prepayment mechanisms, time switches and like apparatus including a timing element.

In United States Patent No. 1,933,440 a self-starting synchronous motor is proposed in which self-starting is effected under the control of a shifting magnetic field while the synchronous running of the motor is effected under the control of an alternating magnetic field.

It is the object of the present invention to provide an improved motor of this type which enables an increased torque to be obtained at synchronous operation.

According to a feature of the invention the pole-pieces which give rise to the alternating magnetic field are arranged to give a more pronounced effect whereby in co-operating with the permanent magnet a greater torque is obtained than in the prior arrangement. The more pronounced effect of the pole-pieces is obtained according to the invention by arranging the pole-pieces so that they extend in a direction parallel to the axis of the rotor.

According to a further feature of the invention with the construction set out above a permanent magnet can be employed in which the polepieces are in the same plane as the body of the magnet, which construction it will be understood is more simple to manufacture than the magnet of the prior construction where the polepieces are substantially at right angles to the body of the magnet.

In the prior construction the two sets of polepieces giving rise to the alternating magnetic field are interlocked and the annular member carrying one set of polepieces was held in position by means of non-magnetic spacers inserted between adjacent polepieces. Such a method of securing the polepieces is however not possible in the present construction and it is a further object of the invention to provide improved securing means for the polepieces.

According to a further feature of the invention alternate ones of the polepieces are integral with an annular member which is held in position either by means of an intermediate member mounted on the core or by means of an intermediate member secured to the remaining polepieces which give rise to the alternating magnetic field.

The invention will be better understood from the following description of two embodiments given by way of example taken in conjunction with the accompanying drawing in which:

Fig. 1 shows an exploded view of one embodiment,

Fig. 2 shows the stator portion of the second embodiment with the permanent magnet rotor in position and Fig. 3 shows a cross-sectional view of the second embodiment.

The motor of both embodiments is of the same type as that described in United States Patent No. 1,933,440 to which reference may be had for a full description of the method of operation.

Both the embodiments shown comprise a magnetic core 1 to which is attached at one end the two polepieces 2 and 2a. A winding 3 is mounted on the core 1 with the polepieces 2 and 2a surrounding it. Between the polepieces 2 and 2a is provided a copper lag plate 4 which when the winding 3 is energised causes a shifting magnetic field to be generated by the polepieces 2 and 2a together with the return polepieces 5 and 5a. The shifting field acts on the induction rotor 6, which rotor is provided with a driving pinion 7. The polepieces 5 and 5a are provided on a ring 8 of magnetic material which ring also carries the alternate ones 9 of the polepieces which give rise to the alternating magnetic field. The remaining polepieces 9a are formed integral with a disc 10 fixed to the core of the motor. The polepieces 9 and 9a are arranged at right angles to the disc 10 that is in a direction parallel to the axis of the motor and with the disc define a cylindrical recess in which the permanent magnet rotor 11 rotates. With this construction it will be understood that means must be provided for fixing the ring 8 relative to the remainder of the stator structure and the two embodiments show different means for effecting this.

Referring to Fig. 1 all the polepieces which give rise to the alternating magnetic field are embedded in a ring 12 of non-magnetic material preferably lead. As will be seen from the drawing the effective faces of the polepieces are left exposed and the ring extends only to the height of the polepieces. It will be understood that since the polepieces 9a are fixed with relation to the core and winding, the provision of the ring 12 will also fix the polepieces 9. The ring 12 is split at three places 13, 14 and 15 around the circumference by leaving a gap between adjacent polepicces in order to prevent any interference with the flux distribution.

Referring to Figs. 2 and 3 the method employed in this embodiment is to mount a disc 16 of non-magnetic material on the core between the winding 3 and the disc 10. Preferably the disc 16 is of brass and is split to prevent any interference with the flux distribution and has a diameter substantially the same as that of the ring 8. The ring 8 is then riveted to the disc 16 by rivets as shown at 17. The current supply to the motor is taken through the two leads 18 and 19.

I claim:

1. A synchronous electric motor comprising a core, a winding on said core, magnetic members extending from each end of said core, an intermediate magnetic member having polepieces co-operating respectively with a set of polepieces extending from each end of said core, one co-operating set of polepieces being arranged to produce a shifting magnetic field and the other co-operating set of polepieces being arranged to extend in a direction parallel to the axis of the motor to produce an alternating magnetic field when said winding is excited with alternating current, there being air gaps in series between said magnetic members and said intermediate magnetic members whereby the fluxes of said shifting and alternating magnetic fields are in series, and a rotor comprising an induction element co-operating with said shifting magnetic field for self starting purposes and a flat permanent magnet having a plurality of polepieces in the same plane as the body of the magnet and arranged to be embraced by the co-operating polepieces at which an alternating magnetic field is produced to ensure synchronous running of the motor by forces acting in a plane at right angles to the axis of the motor.

2. A synchronous electric motor comprising a core, a winding on said core, magnetic members extending from each end of said core, an intermediate magnetic member having polepieces co-operating respectively with a set of polepieces extending from each end of said core, one co-operating set of polepieces being arranged to produce a shifting magnetic field and the other co-operating set of polepieces being arranged to extend in a direction parallel to the axis of the motor to produce an alternating magnetic field when said winding is excited with alternating current, there being air gaps in series between said magnetic members and said intermediate magnetic members whereby the fluxes of said shifting and alternating magnetic fields are in series, non-magnetic supporting means for securing the intermediate member in position so that its polepieces are in correct relative position with the polepieces with which they co-operate, and a rotor comprising an induction element co-operating with said shifting magnetic field for self-starting and a flat permanent magnet having a plurality of polepieces in the same plane as the body of the magnet and arranged to be embraced by the co-operating polepieces at which an alternating magnetic field is produced to ensure synchronous running of the motor by forces acting in a plane at right angles to the axis of the motor.

3. A synchronous electric motor comprising a core, a winding on said core, magnetic members extending from each end of said core, an intermediate magnetic member having polepieces co-operating respectively with a set of polepieces extending from each end of said core, one co-operating set of polepieces being arranged to produce a shifting magnetic field and the other co-operating set of polepieces being arranged to extend in a direction parallel to the axis of the motor to produce an alternating magnetic field when said winding is excited with alternating current, there being air gaps in series between said magnetic members and said intermediate magnetic members whereby the fluxes of said shifting and alternating magnetic fields are in series, a non-magnetic disc secured to said core and to which said intermediate member is attached to secure it with its polepieces in correct relative position with the polepieces with which it co-operates and a rotor comprising an induction element co-operating with said shifting magnetic field for self-starting and a flat permanent magnet having a plurality of polepieces in the same plane as the body of the magnet and arranged to be embraced by the co-operating polepieces at which an alternating magnetic field is produced to ensure synchronous running of the motor by forces acting in a plane at right angles to the axis of the motor.

4. A synchronous electric motor comprising a core, a winding on said core, magnetic members extending from each end of said core, an intermediate magnetic member having polepieces co-operating respectively with a set of polepieces extending from each end of said core, one co-operating set of polepieces being arranged to produce a shifting magnetic field and the other co-operating set of polepieces being arranged to extend in a direction parallel to the axis of the motor to produce an alternating magnetic field when said winding is excited with alternating current, there being air gaps in series between said magnetic members and said intermediate magnetic members whereby the fluxes of said shifting and alternating magnetic fields are in series, a non-conducting annular ring formed so as to embed the co-operating set of polepieces which extend in a direction parallel to the axis of the motor and thereby support the intermediate member with the polepieces in the correct relative position, and a rotor comprising an induction element co-operating with said shifting magnetic field for self-starting and a flat permanent magnet having a plurality of polepieces in the same plane as the body of the magnet and arranged to be embraced by the co-operating polepieces at which an alternating magnetic field is produced to ensure synchronous running of the motor by forces acting in a plane at right angles to the axis of the motor.

5. A synchronous electric motor comprising a core, a winding on said core, magnetic members extending from each end of said core, an intermediate magnetic member having polepieces co-operating respectively with a set of polepieces extending from each end of said core, one co-operating set of polepieces being arranged to produce a shifting magnetic field and the other co-operating set of polepieces being arranged to extend in a direction parallel to the axis of the motor to produce an alternating magnetic field when said winding is excited with alternating current, there being air gaps in series between said magnetic members and said intermediate magnetic members whereby the fluxes of said shifting and alternating magnetic fields are in series, a non-conducting annular ring cast so as to embed the co-operating set of polepieces which extend in a direction parallel to the axis of the motor and thereby support the intermediate member with the polepieces in the correct relative position, and a rotor comprising an induction element co-operating with said shifting magnetic field for self-starting and a flat permanent magnet having a plurality of polepieces in the same plane as the body of the magnet and arranged to be embraced by the co-operating polepieces at which an alternating magnetic field is produced to ensure synchronous running of the motor by forces acting in a plane at right angles to the axis of the motor.

GILBERT GILLIVER.